US006908419B2

(12) United States Patent
Takashima et al.

(10) Patent No.: US 6,908,419 B2
(45) Date of Patent: Jun. 21, 2005

(54) CONDUCTIVE ROLL

(75) Inventors: Masahiko Takashima, Minokamo (JP); Nobuya Yoshida, Komaki (JP); Satoshi Tatsumi, Kasugai (JP); Tetsuya Itoh, Komaki (JP); Kenichi Tsuchiya, Komaki (JP); Jiro Iwashiro, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/649,053

(22) Filed: Aug. 27, 2003

(65) Prior Publication Data

US 2004/0058791 A1 Mar. 25, 2004

(30) Foreign Application Priority Data

Sep. 20, 2002 (JP) ....................................... 2002-275621

(51) Int. Cl.[7] ................................................ F16C 13/00
(52) U.S. Cl. ........................................... 492/56; 492/49
(58) Field of Search .................. 492/56, 49; 428/36.91, 428/375, 383; 399/176

(56) References Cited

U.S. PATENT DOCUMENTS

| | | | | |
|---|---|---|---|---|
| 5,312,662 A | | 5/1994 | Ohta et al. | |
| 5,804,309 A | * | 9/1998 | Itoh et al. | 428/375 |
| 6,190,295 B1 | | 2/2001 | Kawano et al. | |
| 6,283,904 B1 | | 9/2001 | Itoh et al. | |

FOREIGN PATENT DOCUMENTS

| | | | |
|---|---|---|---|
| EP | 0 779 562 A1 | | 6/1997 |
| EP | 0 797 128 A2 | | 9/1997 |
| EP | 0 867 782 A2 | | 9/1998 |
| EP | 0 938 032 A2 | | 8/1999 |
| EP | 1 039 350 A2 | | 9/2000 |
| JP | 5-88509 A | | 4/1993 |
| JP | 7-140760 A | | 6/1995 |
| JP | 10-186799 A | | 7/1998 |
| JP | 10-319678 A | | 12/1998 |
| JP | 11-237782 A | | 8/1999 |
| JP | 2000-274424 | | 10/2000 |
| JP | 2000-284571 A | | 10/2000 |
| JP | 2002-40755 A | * | 2/2002 |
| JP | 2002-132014 A | * | 5/2002 |
| JP | 2002-244402 A | * | 8/2002 |

* cited by examiner

*Primary Examiner*—Marc Jimenez
(74) *Attorney, Agent, or Firm*—Burr & Brown

(57) ABSTRACT

An electrically conductive roll includes a center shaft, an electrically conductive elastic layer formed on an outer circumferential surface of the center shaft, and a resistance adjusting layer formed radially outwardly of the electrically conductive elastic layer. The resistance adjusting layer is formed of a rubber composition which includes a rubber material, a thermoplastic resin having crosslinkable double bonds, at least one electron-conductive agent, at least one ion-conductive agent, and at least one electrically insulating filler. The thermoplastic resin, the at least one electron-conductive agent, the at least one ion-conductive agent, and the at least one electrically insulating filler are included in the rubber composition in respective amounts of 3–40 parts by weight, 10–150 parts by weight, not greater than 2 parts by weight, and 20–80 parts by weight, per 100 parts by weight of the rubber material.

10 Claims, 1 Drawing Sheet

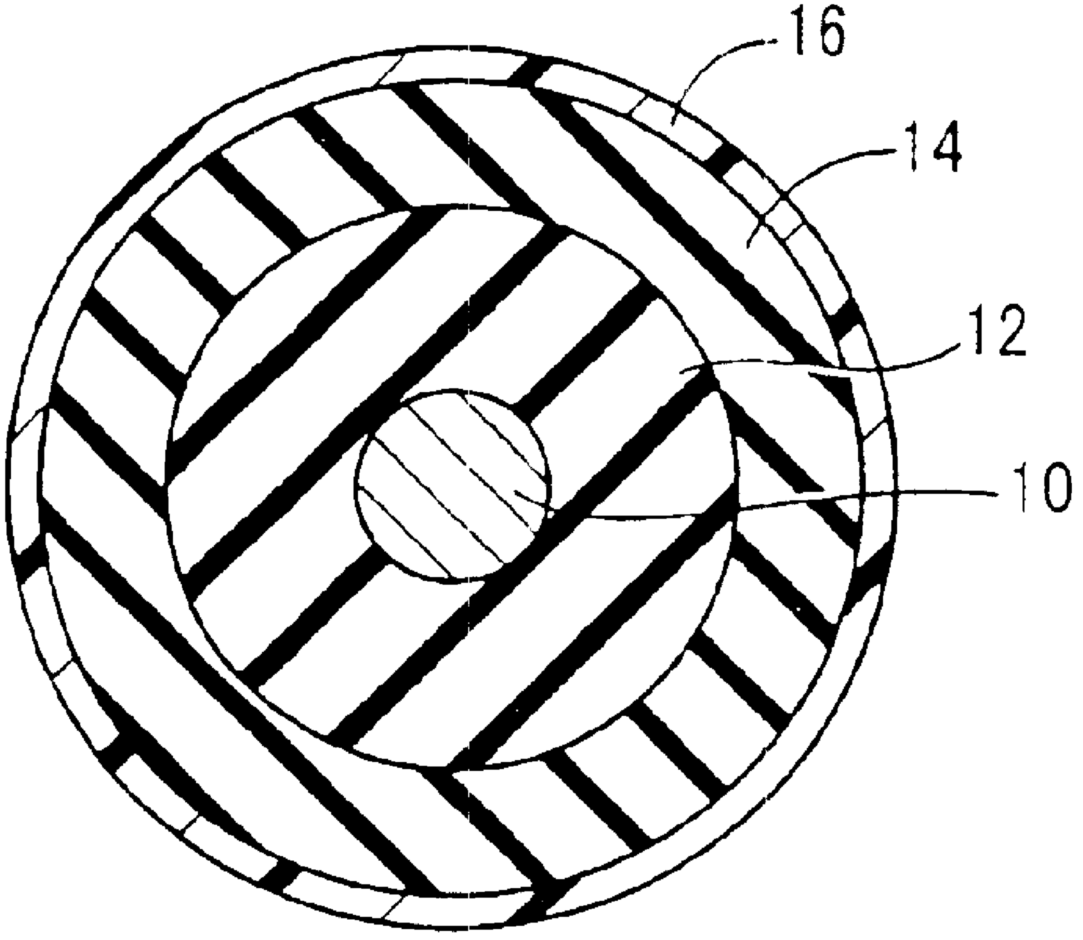
16
14
12
10

CONDUCTIVE ROLL

This application claims the benefit of Japanese Patent Application No. 2002-275621 filed on Sep. 20, 2002, the entirety of which is incorporated herein by reference.

BACKGROUND OF THE INVENTION

1. Field of the Invention

The present invention relates to an electrically conductive roll such as a charging roll, for use in an electrophotographic copying machine, printer, etc.

2. Discussion of Related Art

A charging roll is installed on an electrophotographic copying machine, printer, etc., such that the charging roll is rotated while it is held in pressing contact with an outer circumferential surface of a photosensitive drum, whereby the outer circumferential surface of the photosensitive drum is charged by the charging roll. Described more specifically, the charging roll is used in a roll charging method wherein the photosensitive drum on which an electrostatic latent image is formed is charged by the charging roll. In the roll charging method, the photosensitive drum and the charging roll are rotated such that the charging roll to which a voltage is applied is held in pressing contact with the outer circumferential surface of the photosensitive drum, to thereby charge the outer circumferential surface of the photosensitive drum.

The conductive roll such as the charging roll described above generally includes a suitable center shaft (core metal) as an electrically conductive body, an electrically conductive elastic layer formed on an outer circumferential surface of the center shaft and provided by a rubber layer or a foamed rubber layer, for instance, and a resistance adjusting layer formed on an outer circumferential surface of the conductive elastic layer. The conductive roll further includes, as needed, a protective layer formed on an outer circumferential surface of the resistance adjusting layer.

In the conductive roll constructed as described above, the resistance adjusting layer formed radially outwardly of the conductive elastic layer is conventionally formed of a rubber composition as disclosed in JP-A-11-237782 and JP-A-2000-274424, for instance, which rubber composition includes a rubber material, an electron-conductive agent/agents such as carbon black, an ion-conductive agent/agents such as a quaternary ammonium salt, and an electrically insulating filler/fillers such as silica, in respective suitable amounts. The resistance adjusting layer formed of the rubber composition described above exhibits a suitable degree of electric resistance.

The resistance adjusting layer formed of the rubber composition described above, however, suffers from deterioration of its durability due to an electric current applied thereto during a long use of the roll, in other words, the resistance adjusting layer suffers from an increase in the electric resistance. When the electric resistance is increased up to a level higher than a tolerable or allowable level of a machine on which the conductive roll is installed, an image reproduced by using the conductive roll undesirably suffers from deterioration in the quality due to uneven charging of the photosensitive drum by the conductive roll (due to reduced charging uniformity). For instance, the reproduced image suffers from a multiplicity of sand-like black dots, and the entirety of the image tends to be blackened or darkened.

To prevent deterioration of image quality due to uneven electric resistance, JP-A-2000-284571 proposes a resistance adjusting layer which is formed of a resin composition that includes a plurality of resin materials such as polyolefin. The resistance adjusting layer formed of such a resin composition, however, has a lower degree of resistance to permanent set than the resistance adjusting layer formed of the rubber composition described above. Even if the resistance adjusting layer is formed of a rubber composition which includes a resin such as polyolefin resin, it is difficult to effectively prevent the resistance adjusting layer from being permanently set.

DISCLOSURE OF THE INVENTION

The present invention was made in view of the background art described above. It is therefore an object of this invention to provide an electrically conductive roll which has a high degree of resistance to permanent set and which does not suffer from a considerable increase of the electric resistance due to an electric current applied to the roll during a long use of the roll, and consequent deterioration of quality of a reproduced image such as occurrence of sand-like dots.

The object indicated above may be achieved according to the principle of the present invention, which provides an electrically conductive roll including a center shaft, an electrically conductive elastic layer formed on an outer circumferential surface of the center shaft, and a resistance adjusting layer formed radially outwardly of the electrically conductive elastic layer, wherein the resistance adjusting layer is formed of a rubber composition which includes a rubber material, a thermoplastic resin having crosslinkable double bonds, at least one electron-conductive agent, at least one ion-conductive agent, and at least one electrically insulating filler, the thermoplastic resin, the at least one electron-conductive agent, the at least one ion-conductive agent, and the at least one electrically insulating filler being included in the rubber composition in respective amounts of 3–40 parts by weight, 10–150 parts by weight, not greater than 2 parts by weight, and 20–80 parts by weight, per 100 parts by weight of the rubber material.

In the present electrically conductive roll constructed as described above, the resistance adjusting layer is formed of the predetermined rubber composition which is obtained by adding, to a rubber material, at least one electron-conductive agent, at least one ion-conductive agent, at least one electrically insulating filler, and a thermoplastic resin, in respective suitable amounts. Owing to the presence of the thermoplastic resin in the rubber composition, the durability of the resistance adjusting layer with respect to the electric current applied thereto during the operation of the conductive roll is effectively improved, so that an increase of the electric resistance can be advantageously avoided or minimized. Accordingly, the uneven charging of the photosensitive drum by the conductive roll is effectively prevented, so that an image reproduced by using the present conductive roll does not suffer from defects such as sand-like dots. While the mechanism of improvement of the durability of the resistance adjusting layer with respect to the electric current is not clear, the inventors speculate that the durability is improved owing to an interaction between the thermoplastic resin and the electron-conductive agent such as carbon black dispersed in a matrix of the rubber material.

The thermoplastic resin included in the present rubber composition for the resistance adjusting layer has the crosslinkable double bonds, so that the thermoplastic resin can be co-crosslinked with the rubber material by a vulcanizing agent (crosslinking agent) added to the rubber composition for vulcanizing the rubber material. Accordingly, the present resistance adjusting layer in which the thermoplastic resin is co-crosslinked with the rubber material by the vulcanizing agent does not suffer from deterioration of the resistance to permanent set conventionally experienced in the resistance adjusting layer formed of only the resin or the rubber composition in which the thermoplastic resin is simply included. Therefore, the present conductive roll exhibits an excellent resistance to permanent set.

In one preferred form of the conductive roll according to the present invention, the resistance adjusting layer is formed by extrusion of the rubber composition on an outer circumferential surface of the electrically conductive elastic layer. Owing to the presence of the thermoplastic resin in the rubber composition, the viscosity of the rubber composition is suitably lowered, so that the rubber composition is extruded with higher stability than in a case where the rubber composition does not include the thermoplastic resin. Further, the surface of the extruded resistance adjusting layer is smoothed, so that the resistance adjusting layer exhibits a sufficiently high degree of surface smoothness.

In another preferred form of the conductive roll according to the present invention, the thermoplastic resin has a melting point in a range from 40° C. to 100° C.

As the rubber material, a nitrile rubber (NBR) or a hydrogenated nitrile rubber (H—NBR) is preferably employed. As the electrically insulating filler, silica is preferably employed.

BRIEF DESCRIPTION OF THE DRAWING

The above and other objects, features, advantages and technical and industrial significance of the present invention will be better understood by reading the following detailed description of a presently preferred embodiment of the invention, when considered in connection with the accompanying drawing, in which the single FIGURE is a transverse cross sectional view of an electrically conductive roll constructed according to the present invention.

DETAILED DESCRIPTION OF THE PREFERRED EMBODIMENT

Referring to the drawing, there is shown one representative example of a roll structure employed in a conductive roll according to the present invention. In the drawing, the reference numeral 10 denotes a bar- or pipe-shaped electrically conductive center shaft (core metal) formed of metal such as a stainless metallic material, for example. As well known, on an outer circumferential surface of the center shaft 10, there is provided an electrically conductive elastic layer 12 constituted by a rubber elastic body or a foamed rubber body each having a relatively low hardness. Further, a resistance adjusting layer 14 and a protective layer 16 having respective suitable thickness values are formed radially outwardly of the conductive elastic layer 12 in the order of description.

In the present conductive roll constructed as described above, the conductive elastic layer 12 is formed on the outer circumferential surface of the center shaft 10 by using any known electrically conductive rubber elastic materials, electrically conductive elastomer materials, or foamable materials thereof, i.e., conductive foamable rubber materials. Accordingly, the conductive elastic layer 12 permits the conductive roll to have a low degree of required hardness or a high degree of required flexibility. As the rubber elastic material, at least one of known rubber materials such us EPDM, SBR, NR and polynorbornane rubber may be used. The material for the conductive elastic layer 12 further includes a conductive agent/agents such as carbon black, a metal powder, an electrically conductive metal oxide, and a quaternaly azunionium salt, so that the required conductivity is given to the conductive elastic layer 12 and the volume resistivity of the conductive elastic layer 12 is adjusted to a desired level. Where the rubber elastic material as used for forming the conductive elastic layer 12, a large amount of a softening agent such as a process oil or a liquid polymer is added to the rubber elastic material, so that the obtained conductive elastic layer 12 has a low degree of hardness or a high degree of flexibility. Where the conductive elastic layer 12 is formed of the conductive rubber elastic material, the conductive elastic: layer 12 has a volume resistivity in a range from $1\times10^1$ Ω·cm to $1\times10^4$ Ω·cm and a thickness in a range from 1 mm to 10mm, preferably in a range from 2 mm to 4 mm. Where the conductive elastic layer 12 is formed of the conductive foamable rubber material, the conductive elastic layer 12 has a volume resistivity in a range from $1\times10^3$ Ω·cm to $1\times10^6$ Ω·cm and a thickness in a range from 2mm to 10 mm, preferably in a range from 3 mm to6mm.

In the present conductive roll shown in the drawing, the resistance adjusting layer 14 is formed radially outwardly of the electrically conductive elastic layer 12 described above, so that the electric resistance of the conductive roll is controlled, to thereby increase the withstand voltage (the resistance to current leakage). The present invention is characterized in that the resistance adjusting layer 14 is formed by using a rubber composition in which a suitable amount of a thermoplastic resin is included.

Described more specifically, the rubber composition for the resistance adjusting layer 14 is obtained by adding, to a rubber material which will be described later, respective amounts of at least one electron-conductive agent, at least one ion-conductive agent, at least one electrically insulating filler, and 3 to 40 parts by weight of the thermoplastic resin having crosslinkable double bonds per 100 parts by weight of the rubber material. Owing to the presence of the thermoplastic resin, the deterioration of the durability of the electric resistance adjusting layer with respect to the electric current applied thereto during a long use of the roll is prevented, so that a consequent increase of the electric resistance can be effectively avoided. The resistance adjusting layer formed of the rubber composition described above is effective to prevent a reproduced image from suffering from defects such as sand-like dots, and advantageously exhibits a high degree of resistance to permanent set.

The rubber material as one constituent element of the rubber composition for the resistance adjusting layer 14 is suitably selected from various known rubber materials to which electrically conductive agents (which will be described) are added, so that the resistance adjusting layer to be obtained is given the required conductivity and has a desired level of electric resistance. It is particularly preferable to use a nitrile rubber (NBR) or a hydrogenated nitrile rubber (H—NBR) since the effect obtained by the addition of the thermoplastic resin having the crosslinkable double bonds is significantly improved where the NBR or the H—NBR is used as the rubber material included in the rubber composition for the resistance adjusting layer 14.

The thermoplastic resin added to the rubber material is not particularly limited, as long as the thermoplastic resin provides the effects described above and has crosslinkable double bonds. In particular, it is preferable to use a thermoplastic resin whose melting point is held in a range from 40° C. to 100° C., more preferably in a range from 50° C. to 90° C. If the thermoplastic resin whose melting point is in a range from 40° C. to 100° C. is used, the viscosity of the rubber composition is suitably lowered, so that the rubber composition can be extruded with high stability. Further, the surface of the extruded resistance adjusting layer 14 is given sufficiently high degrees of glossiness and smoothness, to thereby advantageously prevent uneven charging of the photosensitive drum by the conductive roll, for preventing uneven application of the toner to the photosensitive drum. If the melting point of the thermoplastic resin is less than 40° C., ease of handling of the thermoplastic resin is deteriorated under a high temperature condition in a summer season, accordingly deteriorating the workability. If the melting point of the thermoplastic resin exceeds 100° C., the thermoplastic resin is not sufficiently plasticized upon extrusion, undesirably deteriorating formability. If the rubber composition is extruded at a high temperature, the surface of the extruded resistance adjusting layer 14 may not be sufficiently smoothed due to scorch, etc.

The above-described thermoplastic resin having the crosslinkable double bonds is co-crosslinked with the rubber material such as the NBR or the H—NBR by a rubber vulcanizing agent (crosslinking agent) such as sulfur which is added to the rubber composition for vulcanizing the rubber material. Since the thermoplastic resin is co-crosslinked with the rubber material, the present conductive roll does not suffer from the problem of deterioration of the resistance to permanent set.

A specific example of the thermoplastic resin having the crosslinkable double bonds and the melting point of 40° C. to 100° C. is "VESTENAMER 8012" available from Hüls, Germany. Such a commercially available thermoplastic resin is suitably used in the present invention. The "VESTENAMER 8012" is a polyoctenamer having a melting point of about 55° C. and a cis/trans ratio of about 2/8, and can be crosslinked by various kinds of vulcanizing agents such as sulfur, peroxide, phenol resin and quinonedioxime used for vulcanizing the rubber.

The thermoplastic resin described above is included in the rubber composition for the resistance adjusting layer 14 in an amount of 3 to 40 parts by weight, preferably 5 to 30 parts by weight per 100 parts by weight of the rubber material. If the amount of the thermoplastic resin is less than 3 parts by weight per 100 parts by weight of the rubber material, the effect to be favorably exhibited by the thermoplastic resin cannot be obtained. The amount of the thermoplastic resin exceeding 40 parts by weight undesirably deteriorates formability. In addition, the hardness of the resistance adjusting layer 14 is considerably increased. Where a conductive roll whose resistance adjusting layer has a considerably high degree of hardness is used, a charging noise may be large or the outer surface of the photosensitive drum with which the conductive roll is held in contact may be chipped, peeled or otherwise damaged.

Examples of the electron-conductive agent included in the rubber composition for giving the required conductivity to the resistance adjusting layer 14 include carbon black such as FEF, SRF, Ketjenblack, and acetylene black, a metal powder, an electrically conductive metal oxide such as c-$TiO_2$ or c-ZnO, graphite, and carbon fiber. The electron-conductive agent is generally included and dispersed in the resistance adjusting layer 14 as electrically conductive particles having an average particle size of about 120 μm or smaller and a volume resistivity of about $1\times10^1$ Ω·cm or lower. The amount of the electron-conductive agent is suitably determined depending upon the kind of the electron-conductive agent to be used. If the amount of the electron-conductive agent is excessively small, the effect favorably exhibited by the electron-conductive agent is not obtained. An excessively large amount of the electron-conductive agent undesirably deteriorates formability of the resistance adjusting layer 14. Further, the excessively large amount of the electron-conductive agent is less likely to be uniformly dispersed. In view of this, the electron-conductive agent is used in an amount of about 10–150 parts by weight, preferably about 20–80 parts by weight, per 100 parts by weight of the rubber material.

The ion-conductive agent as one constituent component of the rubber composition for the resistance adjusting layer 14 is used to reduce the dependency of the electric resistance on the temperature, by a combined use with the electron-conductive agent described above, so that the resistance adjusting layer 14 exhibits an intended electric resistance with high stability. Any known ion-conductive agents conventionally used in conductive rolls may be used. For instance, it is preferable to use a quaternary ammonium salt such as trimethyloctadecyl ammonium perchlorate or benzyltrimethyl ammonium chloride. The ion-conductive agent is added to the rubber composition, as needed. The ion-conductive agent is included in an amount of not greater than, 2 parts by weight, preferably 0.5–2 parts by weight, per 100 parts by weight of the rubber material, for preventing the ion-conductive agent from precipitating under a high-temperature and a high-humidity environment.

The electrically insulating filler is used to prevent aggregation of the electron-conductive agent such as carbon black and improve dispersion of the electron-conductive agent, so as to assure even distribution of the electric resistance of the resistance adjusting layer 14. The addition of the electrically insulating filler is effective to avoid the problem of deterioration of quality of a reproduced image due to pinholes or other flaws or defects present on the outer circumferential surface of the photosensitive drum. As the insulating filler, silica is advantageously used. The insulating filler may be particles of calcium carbonate or planar particles or fragments of mica or clay. The electrically insulating filler generally has a volume resistivity of $1\times10^{10}$ Ω·cm or higher. The particle size of the electrically insulating filler is suitably determined depending upon the kind of the filler to be used. For instance, the electrically insulating filler having an average particle size of about 0.01 μm to about 40 μm is used. The amount of the electrically insulating filler to be added to the rubber composition is generally held in a range of 20–80 parts by weight, preferably in a range of 30–75 parts by weight per 100 parts by weight of the rubber material. If the amount of the insulating filler is excessively small, the electron-conductive agent may aggregate. If the amount of the insulating filler is excessively large, the workability such as ease of extrusion and ease of kneading may be deteriorated.

The rubber composition for the resistance adjusting layer 14 further includes a vulcanizing agent and a vulcanizing accelerator known in the art. The rubber composition may further include, as needed, various additives such as an antistatic agent, zinc white, and stearic acid. By using the rubber composition prepared as described above, a layer with a predetermined thickness is formed on the conductive elastic layer 12, and the rubber composition is subjected to a vulcanizing operation at a temperature of 120–180° C. for a time period of 30–120 minutes, whereby the intended resistance adjusting layer 14 is formed. Owing to the presence of the thermoplastic resin in the present rubber composition for the resistance adjusting layer 14, the fluidity of the rubber composition is improved, so that the rubber composition can be extruded with high stability. Since the resistance adjusting layer 14 formed by extrusion has a high degree of surface smoothness, the resistance adjusting layer 14 is preferably formed by extrusion of the rubber composition on the outer circumferential surface of the conductive elastic layer 12.

The resistance adjusting layer 14 formed of the rubber composition including the various components described above generally has a volume resistivity in a range from about $1\times10^5$ Ω·cm to about $1\times10^{11}$ Ω·cm. The thickness of the resistance adjusting layer 14 is generally held in a range from about 100 μm to about 800 μm from the viewpoint of operation and manufacture.

After the resistance adjusting layer 14 is formed, the protective layer 16 is formed, as needed, on the resistance adjusting layer 14. The protective layer 16 is provided for preventing the toner from adhering to and accumulating on the surface of the conductive roll. The protective layer 16 is formed, for example, by mixing a resin composition which includes a nylon material such as N-methoxylated nylon, or a fluorine-modified acrylate resin, with the conductive agent such as the carbon black or the electrically conductive metal oxide, such that the protective layer 16 has a volume resistivity in a range from $1\times10^8$ Ω·cm to $1\times10^{13}$ Ω·cm. The thickness of the protective layer 16 is generally held in a range from about 3 μm to 20 μm.

In producing the conductive roll shown in the drawing, various known methods may be employed. For instance, by using the rubber composition for the conductive elastic layer 12 and the rubber composition for the resistance adjusting layer 14, the conductive elastic layer 12 and the resistance adjusting layer 14 are formed in this order on the outer circumferential surface of the center shaft 10 by known methods such as extrusion and molding. Subsequently, the protective layer 16 is formed by a known coating method such as dipping on the outer circumferential surface of the resistance adjusting layer 14 such that the protective layer 16 has a predetermined thickness. Alternatively, there is initially prepared a tube by using the rubber composition for the conductive elastic layer 12 or a two-layered tube by using the respective rubber compositions for the conductive elastic layer 12 and the resistance adjusting layer 14. After the center shaft 10 is positioned within an inner bore of the tube, the tube is subjected to vulcanization, so that the conductive elastic layer 12 and/or the resistance adjusting layer 14 is/are formed on the center shaft 10. Thereafter, the protective layer 16 is formed by the coating method, to thereby provide the intended conductive roll.

The thus constructed conductive roll wherein the conductive elastic layer 12, the resistance adjusting layer 14, and the protective layer 16 are formed in the order of description on the center shaft 10 exhibits a low degree of hardness or a high degree of flexibility and good conductivity owing to the conductive elastic layer 12. In addition, the present conductive roll exhibits an excellent withstand voltage or current leakage owing to the resistance adjusting layer 14. Further, the toner is effectively prevented from adhering to or accumulating on the surface of the roll owing to the protective layer 16 formed as needed.

The present rubber composition for the resistance adjusting layer 14 includes the suitable amount of the thermoplastic resin having the crosslinkable double bonds, in addition to the electron-conductive agent, the ion-conductive agent, and the electrically insulating filler. Accordingly, the durability of the resistance adjusting layer 14 with respect to the electric current applied thereto is effectively improved, so that a consequent increase of the electric resistance in the resistance adjusting layer 14 is minimized or prevented even after a long use of the conductive roll. Accordingly, the image reproduced by using the present conductive roll does not suffer from defects such as sand-like dots which would arise from uneven charging of the photosensitive drum by the conductive roll.

The thermoplastic resin is co-crosslinked with the rubber material, to thereby effectively avoid the problem of deterioration of the resistance to permanent set. Thus, the present conductive roll exhibits an excellent resistance to permanent set.

The conductive roll constructed according to the present invention and having excellent characteristics described above is advantageously used as a charging roll.

EXAMPLES

To further clarify the present invention, some examples of the present invention will be described. It is to be understood that the present invention is not limited to the details of these examples and the foregoing description, but may be embodied with various changes, modifications and improvements that may occur to those skilled in the art, without departing from the scope of the invention defined in the attached claims.

Various conductive rolls each having a structure shown in the drawing were produced in the following manner. Initially, there were prepared a rubber composition for the conductive elastic layer (12), four kinds of rubber compositions for resistance adjusting layers (14) including respective different amounts of the thermoplastic resin having the crosslinkable double bonds, and a material for the protective layer (16). As the thermoplastic resin having the crosslinkable double bonds, polyoctenamer ("VESTENAMER 8012" available from Hüls, Germany and having a melting point of about 55° C.) was used. The material for the protective layer (16) was dissolved in methyl ethyl ketone so as to provide a coating liquid having a suitable viscosity value.

| <Composition for the conductive elastic layer (12)> | |
|---|---|
| ethylene propylene rubber | 100 (parts by weight) |
| carbon black | 25 |
| zinc oxide | 5 |
| stearic acid | 1 |
| process oil | 30 |
| dinitrosopentamethylene tetramine (foaming agent) | 15 |
| sulfur | 1 |
| dibenzothiazole disulfide (vulcanization accelerator) | 2 |
| tetramethylthiuram monosulfide (vulcanization accelerator) | 1 |
| **<Composition for the resistance adjusting layer (14)>** | |
| NBR (rubber material) | 100 (parts by weight) |
| VESTENAMER 8012 (crosslinkable thermoplastic resin) | variable (0, 5, 30 or 50 parts by weight) |
| REF carbon black (electron-conductive agent) | 45 |
| quaternary ammonium salt (ion-conductive agent) | 1 |
| silica (electrically insulating filler) | 50 |
| zinc oxide | 5 |
| stearic acid | 1 |
| dibenzothiazole disulfide | 1 |

-continued

| | | |
|---|---|---|
| tetramethylthiuram monosulfide | 1 | |
| sulfur | 1 | |
| <Composition for the protective layer (16)> | | |
| fluorine-modified acrylate resin | 50 (parts by weight) | |
| fluorinated olefin resin | 50 | |
| electrically conductive titanium oxide | 100 | |

The rubber composition for the conductive elastic layer and the rubber composition for each resistance adjusting layer were concurrently passed through an extruder, so as to obtain a two-layered laminar tube consisting of an inner layer that gives the conductive elastic layer and an outer layer that gives the resistance adjusting layer. Subsequently, an iron core metal (shaft) having an outside diameter of 6 mm and plated with nickel was inserted into an inner bore of the laminar tube after the outer surface of the core metal was coated with a suitable electrically conductive adhesive. An assembly of the laminar tube and the shaft (10) inserted therein was then placed in position within a cylindrical metal mold. Thereafter, the laminar tube was heated at a temperature of 170° C. for 30 minutes, for vulcanizing the rubber compositions of the inner and outer layers of the tube and foaming the inner layer, so as to provide an intermediate rubber roll including a 3 mm-thick conductive elastic layer (12) constituted by the electrically conductive foamed rubber body and a 500 $\mu$m-thick resistance adjusting layer (14) constituted by the non-foamed semi-conductive rubber. The conductive elastic layer (12) and the resistance adjusting layer (14) were integrally laminated in this order on the outer circumferential surface of the shaft (10).

After the intermediate rubber roll was taken out of the metal mold, it was subjected to a coating operation by dipping, using the coating liquid prepared for forming the protective layer, to thereby provide a 5 $\mu$m-thick protective layer (16) integrally formed on the outer circumferential surface of the rubber roll. Thus, there were obtained four conductive rolls according to Examples 1–2 of the present invention and Comparative Examples 1–2, which conductive rolls have respective resistance adjusting layers containing respective different amounts of the thermoplastic resin, i.e., VESTENAMER 8012. The amounts of the thermoplastic resin included in the resistance adjusting layers (14) of the four conductive rolls are indicated in the following TABLE 1.

Each of the thus obtained four conductive rolls according to Examples 1–2 of the present invention and Comparative Examples 1–2 was evaluated in terms of: (1) a ratio of change of the resistance; (2) a reproduced image obtained after an energization test by continuously applying an electric current to the roll; (3) a reproduced image obtained after a printing operation wherein the roll was actually installed on a printer; (4) a resistance to permanent set; (5) hardness; and (5) surface smoothness (glossiness).

(1) A Ratio of Change of the Resistance

Before performing the energization test described below, the resistance value was measured for each of the conductive rolls according to Examples 1–2 and Comparative Examples 1–2, under an environment of 15° C. and 10% RH. In the energization test, there were used ten specimens for each of the conductive rolls according to Examples 1–2 and Comparative Examples 1–2. Under the same environment (15° C. and 10% RH), each specimen of the conducive rolls was subjected to a three-hour energization test in the following manner: The conductive roll was brought into contact with a specular metallic roll (metallic drum) having a diameter of 30 mm such that the axis of the conductive roll was parallel to the axis of the metallic roll. The conductive roll was pressed onto the metallic roll, with a load of 4.9 N (500 gf) applied to each of the axially opposite end portions of the center shaft (10) of the conductive roll. In this state, a constant current of DC200 $\mu$A was continuously applied to the roll with the metallic drum being rotated at 300 rpm. In this condition, the conductive roll was rotated together with the metallic drum. After the three-hour energization test described above, the resistance value of each of the ten specimens of the conductive roll was measured. An average value of the resistance values of the ten specimens was obtained for each of the conductive rolls according to Examples 1–2 and Comparative Examples 1–2. Based on the resistance value before the energization test and the average value of the resistance values of the ten specimens after the energization test, a ratio of change of the resistance was calculated for each of the conductive rolls (Examples 1–2 and Comparative Examples 1–2) according to the following equation. The ratio of change of the resistance of each of the conductive rolls was evaluated according to the following criteria:

Δ: The ratio of change of the resistance was 60–70%.

○: The ratio of change of the resistance was 30–40%.

The results of evaluation are indicated in the TABLE 1. The resistance value was obtained in a known manner by measuring the electric resistance between the surface of each conductive roll and the core metal.

$$\text{Ratio of change of the resistance [\%]} = \{(\text{the resistance value after the energization test}) - (\text{the resistance value before the energization test})\} \times 100/(\text{the resistance value before the energization test})$$

(2) An Evaluation of a Reproduced Image After the Energization Test

The ten specimens for each of the conductive rolls according to Examples 1–2 and Comparative Examples 1–2 used in the energization test (1) described above were used as charging rolls. Described more specifically, each specimen of the conductive rolls was installed on a printer ("LASER·JET·4000" available from HEWLETT-PACKARD JAPAN, LTD., Japan), and halftone images were printed. The halftone images printed by using the conductive rolls according to Examples 1–2 and Comparative Examples 1–2 were evaluated in terms of printing defects, i.e., sand-like white dots appearing in the halftone images due to uneven charging of the conductive roll, according to the following criteria.

x: The sand-like white dots were considerably observed in the halftone images.

Δ-○: The sand-like white dots were slightly observed in the halftone images.

◎: No sand-like white dots were observed in the halftone images printed by using the ten specimens of the conductive roll.

The results of the evaluation are indicated in the TABLE 1. Before carrying out the evaluation test described above, it was confirmed that halftone images printed before each conductive roll had been subjected to the above-described energization test (1) suffered from no sand-like dots.

(3) An Evaluation of a Reproduced Image After a Printing Operation Wherein the Roll was Actually Installed on a Printer There were prepared five specimens for each of the conductive rolls according to Examples 1–2 and Comparative Examples 1–2. Each specimen was used as a charging roll. Described more specifically, under the environment of 15° C. and 10% RH, each specimen was installed on a printer ("LASER·JET·4000" available from HEWLETT-PACKARD JAPAN, LTD., Japan) and subjected to a 10000-sheet printing operation. After the 10000-sheet printing operation, halftone images were printed. The halftone images printed by using the conductive rolls according to Examples 1–2 and Comparative Examples 1–2 were evaluated in terms of printing defects, i.e., sand-like white dots appearing in the halftone images due to uneven charging of the conductive roll, according to the following criteria.

x: The sand-like white dots were considerably observed in the halftone images.

Δ-○: The sand-like white dots were slightly observed in the halftone images.

◎: No sand-like white dots were observed in the halftone images printed by using the five specimens of the conductive roll.

The results of evaluation are indicated in the TABLE 1. Before carrying out the 10000-sheet printing operation, it was confirmed that halftone images printed by using each conductive roll before the printing operation suffered from no sand-like dots.

(4) A Resistance to Permanent Set

There were prepared three specimens for each of the conductive rolls according to Examples 1–2 and Comparative Example 1–2. Each specimen of the conductive rolls was brought into contact with a metallic roll having a diameter of 30 mm such that the axis of the conductive roll was parallel to the axis of the metallic roll. The conductive roll was pressed onto the metallic roll, with a load of 4.9 N (500 gf) applied to each of the axially opposite end portions of the center shaft of the conductive roll. The conductive roll was left in this state under the environment of 40° C. and 95% RH for 24 hours. Thereafter, the load acting on the axially opposite end portions of the center shaft of the conductive roll was removed. Thirty minutes later, an amount of permanent set after the 24-hour pressing was measured at a middle portion of the conductive roll. An average value of the amounts of permanent set of the three specimens was obtained for each of the conductive rolls according to Examples 1–2 and Comparative Examples 1–2. To evaluate the resistance to permanent set of the conductive rolls according to Examples 1–2 and Comparative Examples 1–2, the average value of the amounts of permanent set of the three specimens of each of the conductive rolls was evaluated according to the following criteria:

○: The amount of permanent set was in a range of over 0.040 mm to 0.050 mm.

◎: The amount of permanent set was not larger than 0.040 mm.

The results of evaluation are indicated in the TABLE 1. It is noted that the degree of resistance to permanent set increases with a decrease in the amount of permanent set.

(5) Hardness (Asker C Hardness)

The hardness of each of the conductive rolls according to Examples 1–2 and Comparative Examples 1–2 was measured in the following manner: A spring-type hardness tester (rubber·plastic hardness tester, Asker C-type, available from KOBUNSHI KEIKI CO., LTD., Japan) was used. Described in detail, each conductive roll was supported by V-blocks at its axially opposite ends while the conductive roll extended in the horizontal direction. The measuring head of the tester was brought into contact with the circumferential surface of the conductive roll at its axially middle portion. A force was applied to the tester in the vertical direction, such that a load of 500 g (including the weight of the tester) acted on the conductive roll. Immediately after the application of the load, the hardness of the conductive roll was measured by reading the scale of the tester. The hardness of each conductive roll was evaluated in the following criteria:

x: The hardness of the conductive roll was in a range from 45° to 50°.

○: The hardness of the conductive roll was in a range from 40° to less than 45°.

◎: The hardness of the conductive roll was in a range from 35° to less than 40°.

The results of evaluation are indicated in the TABLE 1.

(6) Surface Smoothness (Glossiness)

Before forming the protective layer (16), the surface glossiness of the resistance adjusting layer (14) of each of the conductive rolls according to Examples 1–2 and Comparative Examples 1–2 was measured by using a "GLOSSGARD II GLOSSMETER" available from PACIFIC SCIENTIFIC, USA), at a specular angle of 75 degrees. The surface smoothness (glossiness) of the resistance adjusting layer (14) of each conductive roll was evaluated according to the following criteria:

○: The glossiness value was in a range of 60–70.

○-◎: The glossiness value was in a range of 70–80.

◎: The glossiness value was in a range of 80–90.

The results of evaluation are indicated in the TABLE 1.

TABLE 1

| | | Examples | | Comparative Examples | |
|---|---|---|---|---|---|
| | | 1 | 2 | 1 | 2 |
| Amount of VESTENAMER 8012*1 [parts by weight] | | 5 | 30 | 0 | 50 |
| Durability with respect to electric current | Ratio of change of resistance [%] | 30–40 | 30–40 | 60–70 | 30–40 |
| | Evaluation | ○ | ○ | Δ | ○ |
| Evaluation of reproduced images after energization test | | ◎ | ◎ | ○-Δ | ◎ |
| Evaluation of reproduced images after printing operation | | ◎ | ◎ | ○-Δ | ◎ |
| Evaluation of resistance to permanent set | | ◎ | ◎ | ○ | ◎ |
| Evaluation of hardness | | ◎ | ○ | ◎ | X |
| Evaluation of surface smoothness (glossiness) | | ○-◎ | ◎ | ○ | ◎ |

*1the amount of VESTENAMER 8012 included in the rubber composition for the resistance adjusting layer per 100 parts by weight of the rubber material As is apparent from the results indicated in the TABLE 1, the conductive rolls according to Examples 1–2 of the present invention wherein the thermoplastic resin having the crosslinkable double bonds was included in the resistance adjusting layers in respective amounts held within the specified range according to the present invention had ratios of change of the electric resistance considerably smaller than the conductive roll of Comparative Example 1. Accordingly, the conductive roll according to the present invention is effective to prevent a reproduced image from suffering from the sand-like dots, and advantageously exhibits a high degree of resistance to permanent set.

In the conductive roll of Comparative Example 1 wherein the thermoplastic resin having the crosslinkable double bonds were not included in the resistance adjusting layer, the electric resistance was considerably increased after the energization test, and the reproduced image obtained after the above-described tests (2) and (3) were likely to suffer from the sand-like dots. In the conductive roll of Comparative Example 2 wherein the resistance adjusting layer included the thermoplastic resin having the crosslinkable double bonds in an amount as large as 50 parts by weight per 100 parts by weight of the rubber material, the hardness was high, resulting in a large charging noise.

As is apparent from the foregoing description, in the present conductive roll whose resistance adjusting layer functioning as one of the constituent layers of the roll structure is formed of the rubber composition which is obtained by adding, to the rubber material, the respective amounts of the electron-conductive agent(s), the ion-conductive agent(s), and the electrically insulating filler(s), and the suitable amount of the thermoplastic resin having the crosslinkable double bonds, an increase of the electric resistance of the resistance adjusting layer due to the electric current applied thereto during a long use of the roll is effectively prevented owing to the presence of the thermoplastic resin. Accordingly, the conductive roll constructed according to the present invention is effective to prevent a reproduced image from suffering from defects such as the sand-like dots, and advantageously exhibits a high degree of resistance to permanent set.

What is claimed is:

1. An electrically conductive roll including a center shaft, an electrically conductive elastic layer formed on an outer circumferential surface of said center shaft, and a resistance adjusting layer formed radially outwardly of said electrically conductive elastic layer, wherein the improvement comprises:

said resistance adjusting layer being formed of a rubber composition which includes a rubber material, a thermoplastic resin having crosslinkable double bonds, at least one electron-conductive agent, at least one ion-conductive agent, and at least one electrically insulating filler, said thermoplastic resin, said at least one electron-conductive agent, said at least one ion-conductive agent, and said at least one electrically insulating filler being included in said rubber composition in respective amounts of 3–40 parts by weight, 10–150 parts by weight, not greater than 2 parts by weight, and 20–80 parts by weight, per 100 parts by weight of said rubber material.

2. An electrically conductive roll according to claim 1, wherein said resistance adjusting layer is formed by extrusion of said rubber composition on an outer circumferential surface of said electrically conductive elastic layer.

3. An electrically conductive roll according to claim 1, wherein said resistance adjusting layer has a volume resistivity in a range from 1 $\times 10^5$ Ω·cm to $1\times 10^{11}$ Ω·cm.

4. An electrically conductive roll according to claim 1, wherein said resistance adjusting layer has a thickness in a range from 100 μm to 800 μn.

5. An electrically conductive roll according to claim 1, wherein said thermoplastic resin is included in said rubber composition in an amount of 5–30 parts by weight per 100 parts by weight of said rubber material.

6. An electrically conductive roll according to claim 1, wherein said thermoplastic resin has a melting point in a range from 40° C. to 100° C.

7. An electrically conductive roll according to claim 1, wherein said thermoplastic resin has a melting point in a range from 50° C. to 90° C.

8. An electrically conductive roll according to claim 1, wherein said thermoplastic resin is a polyoctenamer having a melting point of about 55° C. and a cia/trans ratio of about 2/8.

9. An electrically conductive roll according to claim 1, wherein said rubber material is NBR or H—NBR.

10. An electrically conductive roll according to claim 1, wherein said electrically insulating filler is silica.

* * * * *